United States Patent
Khalili et al.

(10) Patent No.: US 11,326,840 B2
(45) Date of Patent: May 10, 2022

(54) COOLING SYSTEM WITH THERMAL STORAGE

(71) Applicant: Rocky Research, Boulder City, NV (US)

(72) Inventors: Kaveh Khalili, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 16/864,771

(22) Filed: May 1, 2020

(65) Prior Publication Data

US 2021/0318076 A1   Oct. 14, 2021

Related U.S. Application Data

(60) Provisional application No. 63/101,209, filed on Apr. 13, 2020.

(51) Int. Cl.
| | |
|---|---|
| *F28D 17/00* | (2006.01) |
| *F28D 19/00* | (2006.01) |
| *F28D 20/02* | (2006.01) |
| *F25B 1/00* | (2006.01) |

(52) U.S. Cl.
CPC ............... *F28D 20/02* (2013.01); *F25B 1/00* (2013.01)

(58) Field of Classification Search
CPC .................................. F28D 20/02; F28B 1/00
USPC ......................................................... 165/10
See application file for complete search history.

(56) References Cited

U.S. PATENT DOCUMENTS

| | | | |
|---|---|---|---|
| 4,104,185 A | 8/1978 | Schroder | |
| 4,807,696 A | 2/1989 | Colvin et al. | |
| 7,316,262 B1 * | 1/2008 | Rini | F28D 20/023 165/10 |
| 9,677,817 B1 * | 6/2017 | Dudis | F28D 15/00 |
| 2008/0099187 A1 | 5/2008 | Rini et al. | |
| 2014/0060794 A1 | 3/2014 | Ishii et al. | |
| 2015/0017422 A1 * | 1/2015 | Lee | B32B 38/164 428/323 |
| 2016/0120058 A1 | 4/2016 | Shedd et al. | |
| 2016/0226042 A1 | 8/2016 | Hartmann et al. | |
| 2017/0054265 A1 | 2/2017 | Downing | |
| 2018/0252453 A1 | 9/2018 | Rockenfeller et al. | |
| 2019/0360768 A1 | 11/2019 | Dahlberg et al. | |
| 2020/0049424 A1 | 2/2020 | Suzuki et al. | |

FOREIGN PATENT DOCUMENTS

| | | |
|---|---|---|
| EP | 2163520 A1 | 3/2010 |
| GB | 2 567 206 A | 4/2019 |

OTHER PUBLICATIONS

International Search Report for International Application No. PCT/US2021/023699 dated Jun. 28, 2021.
International Search Report for International Application No. PCT/US21/26843 dated Jul. 14, 2021.

* cited by examiner

*Primary Examiner* — Davis D Hwu
(74) *Attorney, Agent, or Firm* — Shumaker & Sieffert, P.A.

(57) ABSTRACT

Disclosed are systems and methods of flexibly cooling thermal loads by providing a thermal energy storage cooling system for burst mode cooling and a vapor compression system for additional and ancillary cooling to efficiently maintain and cool a thermal load such as from a directed energy weapon system.

31 Claims, 4 Drawing Sheets

COOLING SYSTEM WITH THERMAL STORAGE

CROSS-REFERENCE TO RELATED APPLICATIONS

This application claims priority to U.S. Provisional Application No. 63/101,209 entitled "COOLING SYSTEM WITH THERMAL STORAGE" filed on Apr. 13, 2020, the entirety of which is hereby incorporated by reference in its entirety.

BACKGROUND

Field of the Invention

This disclosure relates generally to a thermal energy storage cooling system that is useful to cool systems that output bursts of heat. In particular, the system may include a thermal energy storage system that uses a salt hydrate as a phase change material to cool bursts of heat from a directed energy weapons system.

Description of the Related Art

Conventional vapor compression systems may be efficient at cooling environmental loads, such as rooms or systems with relatively slow gains in heat. However, these systems alone do not generally provide the rapid cooling features necessary to cool a system that outputs bursts of heat. A vapor compression system may take up to a minute, or in some cases more time, to reach full capacity and usually several minutes or longer to provide cooling to the target heat load. However, once these vapor compression systems are running they can be efficient in cooling a target heat load to a specific temperature.

Thermal energy storage systems have been used to level a cooling load by substituting cooling capacity and at times reduce costs in many environments. Many different types of materials have been used as phase change materials within thermal energy storage systems, including inorganic systems such as salt and salt hydrates, organic compounds such as paraffins or fatty acids. Polymeric materials, such as poly (ethylene glycol) have also been used as phase change materials. In addition chilled water and ice systems, have been used. These chilled water systems are reliable but also heavy and bulky as they rely only on the heat capacity of water. Ice storage systems are more compact and lighter than chilled water due to the phase change energy of ice to water, but heat transfer problems for rapid melting and freezing of ice as required for burst cooling, along with the requirement to recharge at temperatures below 0° C. even if the cooling temperature is around 20° C., proved disadvantageous. Paraffins have been used as phase change material in prior systems, although they were not found to be advantageous for cooling rapid bursts of heat. In use, a cooling system reduces the temperature to induce a phase change to solidify the paraffin wax to a solid form within a tank that is part of the thermal energy storage system. A heat transfer fluid is then circulated through the tank so that the solid wax absorbs heat from the heat transfer fluid and melts.

Unfortunately, several properties of paraffin wax, such as its heat transfer properties and melting dynamics resulted in it being a poor choice for applications designed to rapidly cool systems which output bursts of heat.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

One embodiment is a thermal energy cooling system for a high-energy laser. In this embodiment the system includes: a thermal energy storage system comprising phase change material having a transition temperature of between 10° C. and 20° C., a phase change material energy density of at least 200 kJ/kg, a phase change material density of at least 1 g/cc and a phase change material thermal conductivity of at least 0.5 W/mK; a cooling loop comprising a heat transfer fluid connected to the thermal energy storage system and a heat exchanger in thermal communication with the high-energy laser; and a control system programmed to read sensor data and determine when to initiate burst mode cooling to initiate discharge of the thermal energy storage system, wherein the burst mode cooling comprises pumping the heat transfer fluid through the cooling loop including the thermal energy storage system that is capable of discharging over a period of less than five minutes.

Another embodiment is a method of cooling a high-energy laser using a thermal energy storage system. The method includes providing a thermal energy storage system comprising phase change material having a transition temperature of between 10° C. and 20° C., a phase change material energy density of at least 200 kJ/kg, a phase change material density of at least 1 g/cc and a phase change material thermal conductivity of at least 0.5 W/mK; reading sensor data to determine when to initiate burst mode cooling and discharge of the thermal energy storage system; and upon determining that it's time to initiate a burst mode cooling and the discharge, pumping heat transfer fluid through a cooling loop connected to the thermal energy storage system and a heat exchanger in thermal communication with the high-energy laser, wherein the thermal energy storage system is capable of discharging over a period of less than five minutes.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Thermal energy cooling systems and methods are disclosed for rapidly cooling products, devices or other heat loads. Such systems use a thermal energy storage system configured to rapidly cool bursts of heat, such as from a high-energy laser directed energy weapon system. The thermal energy storage system can act as a sink to absorb heat being generated by the directed energy weapons system. In one embodiment, the thermal energy storage system comprises a salt hydrate, such as a potassium fluoride tetra hydrate as the phase change material that is used to store heat.

In one embodiment, the thermal energy cooling system pumps a heat transfer fluid from a heat exchanger in thermal contact with a directed energy weapons system through a thermal energy storage system to rapidly offload the absorbed heat. The heat transfer fluid may be ethylene glycol water or a phase change refrigerant. In this embodiment, they system may be configured to maintain the fiber amplifiers and other critical system components of the laser weapon system between about 15° C.-35° C., 20° C.-30° C. or 22° C.-28° C. or similar temperature ranges.

Thermal energy storage systems that are applicable for use with the above-mentioned high-energy laser cooling system may be configured to undergo a solid-liquid phase change with a phase transition temperature between about 10° C. and about 25° C. This range may be between about 15° C. and 25° C. assuming that a heat transfer fluid (coolant) flow to the laser is has a temperature in the range of about 20° C. to 30° C. Others had previously discussed using ice as a phase change material due to its high phase change energy of 333 kJ/kg. Given that the phase transition temperature of water to ice is at 0° C. and accounting for subcooling and heat transfer, the temperature of a heat transfer fluid needed to freeze ice should be around −6° C. to −10° C. Thus, storing thermal energy in ice for an application that only requires to be cooled to around 20° C. is very energy inefficient. The vapor compression equipment required to cool the heat transfer fluid down to −6° C. to −10° C. will consume a lot of power and needs to be sized for undue large capacity to accomplish fast freezing for such low fluid temperatures.

Phase change material with a more appropriate phase transition temperature between about 10° C. and 20° C. have lower phase change energies, with some paraffins and hydrated salts having a material energy density of around 200 kJ/kg or slightly above. Thus, one embodiment of the invention is a system that uses a phase change material with a phase change material energy density of above 200 kJ/kg of latent heat. This yields a system of reasonable energy density. To achieve compactness the phase change material should also have a relatively high material density. Ice has a material density of roughly 1 g/cc. Paraffins have material densities of less than 1 g/cc often only 0.8 to 0.85 g/cc. In contrast, hydrated salt complexes usually have densities of significantly above 1 g/cc thus making energy storage systems of a given mass of phase change material volumetrically more compact. In one embodiment, the material density of the phase change material used within embodiments of the invention is above 1.1 g/cc, 1.2 g/cc, 1.3 g/cc, 1.4 g/cc, or more making the phase change material very volume effective.

Another property to consider in addition to the size and weight of the thermal energy storage system is the thermal conductivity of the phase change material. As the thermal energy has to travel from the heat transfer surface throughout the phase change material to facilitate the phase change, a higher thermal conductivity correlates to a faster thermal energy propagation and the thicker the phase change material layer can be for a given time period to propagate. A thicker layer of phase change material means there is more material per heat transfer surface area that can be applied. This minimizes the amount of heat transfer hardware needed and thereby minimizes the weight and size of the overall thermal energy storage system. In some embodiments, the thermal conductivity of the phase change material is above 0.6 W/mK and preferably closer to or above 1 W/mK or greater.

While several hydrates and paraffins have phase change energies at or above 200 kJ/kg, suitable paraffins with phase transition temperatures between 10° C. and 25° C., i.e. typically 14, 15 or 16 carbon chain paraffins, fall short in the other thermodynamic properties exhibiting thermal conductivities of often less than 0.2 W/mK and material densities well below 1 g/cc, often below 0.9 g/cc. Paraffins, as well as inorganic hydrates, both exhibit noticeable subcooling during the freezing process, which can be somewhat mitigated with additives for inorganic hydrates. Another disadvantage of organic paraffins is the fact that they do not show crystallization propagation as experienced with most hydrates, wherein the crystallization propagation through the material improves the temperature distribution throughout the material from the subcooled liquid state.

In one embodiment the thermal energy storage system uses a potassium fluoride-based phase change material. The properties of potassium fluoride, and particularly potassium fluoride tetra hydrate allow the thermal energy storage system to rapidly absorb relatively large bursts of heat coming from a system such as a directed energy weapons system. In particular, this salt hydrate was found to have a very good crystal growth propagation that spreads throughout the phase change material and aids thermal distribution into the phase change material. This material also has a high thermal conductivity, which helps minimize thermal gradients. Also, the material density of potassium fluoride tetrahydrate is 1.44 g/cc, which is 70% higher than the 16 C-chain paraffin of similar transition temperature. Therefore, the potassium fluoride tetrahydrate was found to have a 70% higher volumetric density than the similar paraffin. When taking into account the 4 to 5 times higher thermal conductivity and the crystallization propagation ability allowing for a much higher phase change material to heat transfer hardware mass and volume ratio, such potassium fluoride tetrahydrate based systems can be designed to be much lighter and more than twice as compact when compared to for example an n-hexadecane paraffin system of similar melting temperature and phase change energy.

The operating conditions for a laser weapon cooling system in which the phase change materials are used as a thermal energy storage system call for much more rapid melt and freeze periods than traditionally required for seasonal or diurnal thermal energy storage. System discharge (melting) of the phase change material in the thermal energy storage system often has to occur in less than five minutes and more frequently even in less than three, or even two minutes. The time to charge (re-freeze) the phase change material is also much shorter, typically in less than 20 minutes, and often less than 10, 8, 6, 5 or 4 minutes. In some embodiments, once the phase change material in the thermal energy storage system is frozen, so that the storage system charged, the phase change material needs to be maintained in its frozen state. To maintain the phase change material in a frozen state, a vapor compression system may be activated at particular time intervals such that any phase change material which transitioned into a liquid state is cooled back into a frozen state and/or maintained in the frozen state.

During use, the laser weapon may be activated for a total firing period of 1, 2 or 3 or even 5 minutes. Since the firing period usually occurs in pulses of several seconds for each target, as short as 2 or 3 seconds and as long as about 10 to 15 seconds, the total discharge period of 1, 2 or 3 or even 5 minutes can occur over periods of 5 to 30 minutes. Depending on the target occurrence, or lack thereof, the system may also be recharged before it is completely depleted. The thermal management system including the thermal energy storage system, however, usually has a design requirement to be able to operate under a worst case scenario of continuous lasing of 1, 2 or 3 or even 5 minutes, which likely will never occur. Accordingly, the thermal energy cooling system preferably has the capacity to discharge the thermal energy storage system and cool the laser over this entire continuous time period. Of course, the total activation period, including pauses between firing, may be longer, depending on the particular need. In addition, the system preferably can recharge (re-freeze) the phase change media in the thermal energy storage system fairly rapidly once the activation time has ended, for example in less than 20, 10, 8, 6, 5, or 4 minutes so that the thermal energy cooling system can be ready to effectively cool the laser weapon for additional activation periods.

One objective of a thermal energy storage system in the laser weapon thermal management is to reduce mass and volume, for what is often referred to SWaP (size weight and power) in the military, compared to not having a thermal energy storage system. In order to facilitate size and weight advantages a thermal energy storage system is expected to complete the phase change process for well above 50%, preferably above 75% or above 90% of the phase change material within the time constraints given above of typically in less than 25 minutes, and often less than 10, 8, 6, 5 or 4 minutes of freeze time and less than 5 minutes and often 3 minutes or 2 minutes of melt time.

In one embodiment, the thermal energy storage system comprises an enclosure or tank comprising a system of heat transfer tubes running throughout the tank. Depending on design, the phase change material may be located either inside or outside the heat transfer tubes and the heat transfer fluid on the other side. Alternative designs to these tubular systems are plate-type configurations with the phase change material in between plate heat exchangers. Both types of systems, particularly the tubular configurations, may have fins on the phase change medium side for increased heat transfer between the heat transfer media and the phase change material, e.g. potassium fluoride.

In one embodiment, the thermal energy storage system may be made out of one or more modules, each module having a plurality of heat transfer tubes with phase change material inside the heat transfer tubes and heat transfer fluid flowing on the outside of the heat transfer tubes and within the tank. Such a plurality of heat transfer tubes may be in multiple planar levels or in one or more bundles. An example tube diameter may be 0.5 inch, but embodiments may include heat transfer tubes with an outer diameter between about ¼ inch or about 1" depending on system response time requirements, fin heat transfer enhancements, additive heat transfer enhancements or the effectiveness of any crystallization additives used within the phase change material to reduce subcooling. Examples of such crystallization additives include pumice, a textured volcanic glass, which reduces the subcooling during the freezing process.

In one embodiment, a vapor compression system is used to cool the thermal energy storage system prior to use. Typical subcooling for potassium fluoride tetra hydrate phase change medium is 10° C. to 15° C. below its transition temperature of 18° C. Once solidification and freezing of the phase change material has started the heat transfer fluid, cooled by the vapor compression system, can be adjusted to a temperature closer to the transition temperature to complete the freezing process, provided an adequate differential temperature for rapid freezing is maintained. This may call for an operating strategy in which a relatively small amount of cooling energy is transferred from the vapor compression system to the thermal storage system at a temperature of about 5° C. to initiate the nucleation of the phase change material with the remainder of the cooling energy provided with heat transfer fluid that is much closer to the phase change temperature of the potassium fluoride tetra hydrate material. By cooling the phase change material with heat transfer fluid at a relatively higher temperature, the cooling system capacity and energy efficiency is much higher because the vapor compression system does not require as much energy to provide the cooling energy to the heat transfer fluid at a higher temperature and offers a higher cooling capacity.

In one embodiment, the system is operated to retain a reserve of frozen phase change material to prevent the phase change material from completely melting. Because the required heat transfer fluid temperature required to initiate crystallization of the phase change material is relatively high, the system may be more energy efficient by keeping a reserve of crystallized frozen phase change material within the thermal energy storage unit. For example, each sub-containment portion of the thermal energy storage system (e.g. tube, channel, space between plates) may retain a minimum percentage of frozen, crystalized phase change material. For example, the retained minimum percentage may be 1%, 2%, 3%, 4%, 5%, 6%, 7%, 8%, 9%, 10%, 15% or more of the total frozen phase change material. The retained portion may be 2%-5%, 4%-8%, or 5%-10%, 5%-15% 10%-15%, or 15%-20% of total volume of phase change material in the thermal energy storage system. Higher percentages of total frozen phase change material will of course also avoid the need for initial nucleation and crystallization.

If the system retains a minimum amount of frozen phase change material, the temperature of the heat transfer fluid required to freeze the thermal energy storage system can be, for example, between 8° C. and 16° C. If the phase change material is allowed to fully melt, the temperature of the heat transfer fluid may need to be 5° C. or colder to initiate crystallization and freezing of the phase change material. Accordingly, in one embodiment it is more energy efficient to maintain the retained minimum portion of crystalized, frozen phase change material during cooling operations and prevent the phase change material from completely melting.

In one embodiment, the control system monitors the temperature of the phase change material or the heat transfer fluid temperatures entering and exiting the thermal energy storage system along with the flow rate of the heat transfer fluid. From these data, the control system may calculate or estimate the amount of frozen phase change material remaining in the thermal energy storage system. The thermal energy storage system may be made of hundreds of separate tubes, channels or plates. In case of tubes, each tube may have more or less frozen phase change material located within it. Measuring the actual amount of frozen phase change material in each individual tube may not be practical, so estimating the amount of frozen phase change material by measuring the overall temperature of the phase change material and heat transfer fluid flows may be more practical.

If the control system determines that the amount of remaining frozen phase change material is below a predetermined threshold, the control system may initiate the vapor compression system to start circulating heat transfer fluid and freezing the phase change material. In addition, the control system may prevent the system from being able to initiate additional cooling operations using the thermal energy storage system until the vapor compression system has had time to freeze more of the phase change material in the thermal energy storage system. In one embodiment, the system may only allow the system to perform additional cooling cycles if, after such a cooling cycle, the remaining frozen phase change material would remain above the minimum set threshold. To ensure that every tube, or almost every tube, within the thermal energy storage system is very likely to contain at least some frozen phase change material, the system may choose a minimum set threshold value that is higher than what is needed in any particular tube. For example, the system may set the threshold at 15%, such that when the control system determines that only 15% of the total volume of phase change material remains frozen it will activate the vapor control system to start freezing the phase change material. By choosing a minimum value of 15%, this may ensure that each tube within the thermal energy storage system has at least some frozen phase change material to start an efficient cooling cycle. Of course, depending on the system design, it may require the minimum threshold to be set at 5%, 10%, 15% or even 20% to ensure that each tube within the system contains some amount of frozen phase change material. Selecting a higher percentage is of course always an option, however, the higher the percentage of left over frozen material, the lower the thermal energy storage system capacity will be.

In one embodiment, the thermal energy cooling system acts as a burst mode cooling system to remove the heat generated from each firing event of a directed energy weapons system, such as a laser weapons system. During each firing cycle, the system transfers thermal energy from the weapon to the cooling and thermal energy storage system. In one embodiment this can be accomplished by using a set of heat transfer tubes running through the thermal storage system and containing a thermal heat transfer fluid such as glycol/water or refrigerant. Alternatively, the fluid can run outside the heat transfer tubes with the phase change material in the heat transfer tubes. It is also possible, although not always preferred, that refrigerant or thermal heat transfer fluid coming from directed energy weapons system may be routed through a vapor compression system to perform initial cooling on the heated thermal transfer fluid, followed by circulation through the thermal energy storage system.

In another embodiment, the vapor compression system is used to supplement the cooling capacity of the thermal energy storage system as the directed energy weapons system is being fired. Accordingly, during a firing event, the vapor compression system and thermal energy storage system may all act in concert to provide cooling capacity to remove heat from the directed energy weapons system. In one embodiment, the control system for the vapor compression system is a vector drive controller that is used to increase efficiency of the overall system.

In other embodiments, the system comprises a heater configured to increase the temperature of the heat transfer fluid in order to bring the components of the system up to their operating temperature. For example, the components of a laser weapon, such as the laser diode amplifiers and diodes, may be designed to function most reliably at temperatures of between 15° C. and 35° C. If the ambient temperature is 5° C., then the system may activate a heater connected to a heat transfer fluid loop within the system to begin circulating warmed heat transfer fluid to the laser components. Similarly, the components of the hotel load may also need to be warmed up to their operating temperature if they are in a relatively cold ambient environment. Thus, the heater may also be connected through valves to the heat transfer fluid loop that runs through the hotel loads connected to the system. The heater may be heated through waste heat from a generator, or by combustion of fuel, or be an electric resistance heater in some embodiments. In one embodiment, the heater is connected to the controller and a series of temperature sensors in order to maintain each of the system components within their operational temperature range, whether that requires heating, or cooling, of the component.

Directed energy weapons systems may also include additional ancillary mechanical or electrical equipment or components that need to be cooled in order to operate the weapons system efficiently. Such additional equipment, also termed a "hotel load" may include sensors, radar systems, batteries, power modules, generators, pumps, motors, computers, electronics and other equipment that is ancillary to the main weapons system. In particularly warm environments, such as the desert, these additional components may work more efficiently by being cooled prior to use. Thus, in one embodiment, the thermal energy cooling system includes a vapor compression system that acts as an ancillary cooling system configured to cool these additional components (as well as the laser diode amplifiers) to a predetermined temperature, or within a temperature range, so that they operate efficiently in warmer environments.

In some embodiments, the directed energy weapons system and hotel loads are located on a single platform. The platform may include a variety of different sensors to monitor and to send signals to components of the directed energy weapons system and the hotel loads. These sensors are used to generate sensor data that is read by the weapon system including the thermal energy cooling system controller in order to determine the proper time to activate the weapon system including the burst mode cooling cycle and discharge the thermal energy storage system. In some embodiments, the controller also receives sensor data from sensors and systems that are not located on the platform, and the controller may use this external sensor data to help determine the correct time to activate the weapon system and the burst mode cooling event.

The vapor compression system may be composed of multiple compressors, some dedicated to freeze and maintain frozen phase change material, such as potassium fluoride tetra hydrate, in the thermal energy storage system, and some configured to cool the hotel load. However, given a control signal that there is a need to charge the thermal energy storage system, all compressors may be activated to charge the thermal energy storage system if the hotel load is determined to be able to afford a temporary lack of cooling. This determination may be based on whether the individual components of the hotel load are detected to be at or below their individual component design temperature. The compressors, some or all, may also be used to cool the high-energy laser in parallel to use of the thermal energy storage system being discharged. In some embodiments, the vapor compression system has a capacity of about 1 kW to 50 kW, 51 kW to 100 kW, or up to several hundred kilowatts of cooling power or more.

In some embodiments, the vapor compression system comprises a vapor compression system with a variable speed compressor that is controlled to vary the output capacity of the vapor compression system. The vapor compression system may be controlled by a Vector Control System (VCS) that is configured to optimize the efficiency of the vapor compression system by varying the torque placed on the compressor.

Embodiments of the Vector Control System (VCS) described herein expand the one-dimensional speed control of the vapor compression system into a two dimensional speed and torque control system. Incorporating torque control into the vapor compression system allows for optimal use of the compressor motor to increase the overall system efficiency. The VCS usually controls multiple motors within the vapor compression system, such as the compressor motor, as well as fan and blower motors are all optimized with respect to speed and resulting torque operating conditions. A VCS optimization process can take into account characteristics of the compressor motor's performance as a function of speed, compression ratio and absolute pressures. The VCS may also take into account other system motor characteristics in the system to improve the efficiency of condenser fan(s) and in some cases evaporator fans or blowers or fluid pump motors in cases where the evaporator cools a heat transfer fluid. Vector Drive control constitutes a two dimensional energy efficiency optimization incorporating refrigerant flow as well as high side (condenser) air flow and, in some instances low side (evaporator) air flow or pumped fluid flow, deriving the best system energy efficiency obtainable at any given load and temperature condition. As will be recognized, fluid pumps are generally controlled by a motor and the term "pump" as used herein may include the motor that drives the pump. The motor may be part of the pump as a hermetic system or connected to the pump via a gear, belt or pulley, as known to those skilled in the art.

In one example, a vapor compression operating condition that conventionally calls for a certain predetermined compressor speed at a set condition is improved by operating the compressor at a lower torque setting while using the same refrigerant flow. Although the system would be using less torque the resultant cooling capacity would remain the same because the refrigerant flow through the vapor compression circuit doesn't change. The lower compressor torque could be achieved by increasing the airflow of a condenser fan. This increased airflow would lower the condenser temperature and pressure which may decrease the torque required by the compressor to compress the refrigerant. Depending on the compressor motor and condenser fan characteristics, the additional energy required to increase the fan speed could be less than the energy saved by reducing the torque on the compressor. Thus, in this embodiment, the VCS would evaluate the energy required to increase the condenser fan speed and balance that against the energy saved by lowering the torque on the compressor. If the energy saved by reducing the torque on the compressor was greater than the energy required to increase the fan speed, then the VCS would increase the condenser fan to save energy overall.

In other embodiments, reducing the compressor torque may reduce the overall efficiency if the energy required to increase the speed of the condenser fan is more than the energy required to operate the compressor at a higher torque. Thus, the VCS system can vary different components in different components within the vapor compression circuit to increase the overall system efficiency by modulating the torque placed on different motors and by adjusting the speed of the various motors to give the optimum energy efficiency.

The use of a vector control system may reduce the overall electrical energy requirements of a directed energy weapon system by reducing the power requirements for the cooling system. This may be important for directed energy weapons systems that are transportable and powered by portable generator systems using fossil fuels. In these transportable systems, the directed energy weapons system, portable generator, and cooling systems may be located on one or more mobile platforms. Since the energy required to operate the directed energy weapons system is being provided by a portable generator, any savings in electrical energy can translate into a fuel savings. By saving the fuel, the transportable system may be able to remain active for a longer period of time before needing to be refueled.

One embodiment of the invention is a cooling system that includes a thermal energy storage system that is controlled by a vector control system as described above for the vapor compression system. In this embodiment, the vector control system controls the speed and torque of a pump connected to the cooling loop of the thermal energy storage system. The pump may be configured to move a phase change fluid, such as refrigerant, through a cooling loop of the thermal energy storage system and to a heat exchanger connected to the thermal load in need of cooling and the evaporator of the vapor compression system for system charge and maintenance. The torque imposed on the pump is proportional to the pressure drop of the phase change fluid flowing through the heat exchanger and thus a function of the flow rate and the vapor quality, i.e. the ratio of gas to liquid. Adjusting the speed of the pump motor will adjust the speed of the phase change fluid moving through the cooling loop. Because the phase change fluid is present in both liquid and gaseous states, the speed of the pump motor may also affect the quality (liquid/gas ratio) of the phase change fluid. Monitoring the torque placed on the pump motor may allow the vector control system to monitor and control the pressure drop of the phase change fluid as it passes through the pump via the vector control system adjusting the speed of the pump and thus the quality of the phase change fluid to meet a desired target level. In one embodiment, the vector control system is activated while the thermal energy storage system is being charged by the vapor compression system. In another embodiment, the thermal energy storage system is activated during discharge of cooling from the thermal energy storage system. It should be realized that the vector control system may be used any time the thermal energy storage system pump motor is operated regardless of charge, discharge or maintenance cooling status of the thermal energy storage system.

The thermal energy storage system may work by freezing potassium fluoride tetra hydrate, within a tank or within heat transfer tubes or between fins or plates. For example, the vapor compression system may cool a heat transfer liquid, such as propylene glycol or ethylene glycol and water that is run through the thermal energy system in a series of heat transfer channels, heat transfer tubes, plates or other heat exchanger. The heat exchangers may be within a containment, which also houses potassium fluoride tetra hydrate and cool the potassium fluoride tetra hydrate so that it changes from a liquid into a solid. In another embodiment, the thermal energy storage system includes a series of heat transfer tubes filled with phase change material, and the heat transfer fluid runs into the tank and surround the filled heat transfer tubes. When the system needs to offload heat from a firing event, heat transfer fluid (refrigerant or a pumped thermal heat transfer liquid) circulates into the thermal energy storage system and melts the potassium fluoride tetra hydrate into a liquid phase, thereby offloading heat.

It should be realized that thermal energy storage systems are not only made from potassium fluoride tetra hydrate, but also from other salt hydrates such as calcium chloride hydrates, calcium chloride/calcium bromide mixture hydrates, sodium based hydrates, lithium based hydrates, such as lithium chlorate tri-hydrate, etc. In some embodiments, the salt hydrate is the 4 hydrate of potassium fluoride.

In some embodiments, the thermal energy storage system has its own pump connected to route thermal heat transfer fluid through the thermal energy storage system cooling loop. If the thermal heat transfer fluid is a liquid such as ethylene or propylene glycol water, the pump may be a pump that is controlled by a variable speed motor. If the thermal heat transfer fluid is phase change refrigerant, the pump motor may be connected to a vector control system (VCS) as the pressure drop (constituting torque) is now adjustable via the flow rate and the resulting degree of phase change of the refrigerant, also called the quality of the refrigerant. This is the ratio of liquid and gas components of the refrigerant. For example, at a relatively low flow rate with low pressure drop the quality of the refrigerant may go from 90% liquid to 50% liquid and at a high flow rate it may go from 80% liquid to 20% liquid. The vector control system may be programmed to optimize efficiency of the thermal energy storage system pump between the best amount of heat transfer and the resulting pressure drop of the refrigerant, which equates to energy consumption by the pump motor.

The vapor compression system may normally act to cool or heat the hotel load from the ancillary equipment that is adjacent to the directed energy weapons system. However, in some circumstances the vapor compression system may be used to rapidly cool and freeze the phase change material within the thermal energy storage system, and during other times, especially during peak operations times the vapor compression system is also cooling the laser load. Thus, in advance of using the directed energy weapons system, the vapor compression system may be activated to freeze and maintain the phase change material in a frozen or partially frozen state within the thermal energy storage system.

A control system monitors the temperatures of the various systems, including the directed energy weapons system, the ancillary components, the thermal energy system and the vapor compression system. The control system uses stored logic and programming to determine the appropriate use of each component. If the system is idle, and the temperature of the thermal energy storage system is high or indicates a partial melt, the control system may activate the vapor compression system to begin re-freezing the thermal energy storage system. However, if the control system also determines that the ancillary components are too hot, the control system may prioritize having the vapor compression system cool the ancillary components so they don't become damaged before having the vapor compression system re-freeze the phase change material in the thermal energy storage system. The flexibility of the system allows for the control system to work towards being as efficient as possible to cool the components of the system and maintain the system in a state of readiness for the next activation of the directed energy weapons system.

In some embodiments, the hotel load of the directed energy weapons system may need to be within a predetermined temperature range for the thermal energy storage system to efficiently provide rapid cooling. The ancillary cooling system may be configured to maintain the thermal load or related environment at a predetermined temperature to help maximize the efficiency of rapidly cooling the directed energy weapons system with the burst mode cooling process.

It should be realized that the ancillary cooling/heating system may not be directly in thermal contact with the hotel load but may instead be used to cool or heat the environment or equipment directly and/or indirectly relating to the hotel load. For example, the hotel load may be part of a larger system with pumps, motors, and other heat generating equipment. The vapor compression system may be configured to cool this related environment or related equipment. By heating or cooling the equipment adjacent the thermal load, this may help keep the thermal load at a predetermined temperature.

It should also be realized that there may be many different components of the hotel load that each need to be cooled (or heated) by the vapor compression system, either serially or in parallel. In one embodiment, the vapor compression system serially cools a set of hotel load components by running a heat transfer fluid from relatively cool components to hotter components. For example, the vapor compression system may have a fluid line carrying thermal heat transfer fluid to a first heat exchanger adjacent or connected to a first component that is operating at 40° C. As the thermal heat transfer fluid leaves the first heat exchanger it may cool the first component to 35° C. and be warmed to near 30° C. The fluid line may then enter a second heat exchanger that is adjacent to or integrated in a second hotel load component that is operating at 50° C. If the thermal heat transfer fluid still has capacity to absorb additional heat, it can also cool the second component from 50° C. to 45° C. temperature.

In a second embodiment, the vapor compression system may connect in parallel to one of more of the components within the hotel load, such that each component has a heat exchanger tied to fluid cooled coming directly from the evaporator of the vapor compression system.

In one embodiment, the hotel load may be a hotel load of a vehicle. In one embodiment, the hotel load is the thermal load caused by all systems on a vehicle other than propulsion. For example, a hotel load of a military transportation vehicle may be the thermal loads caused by radar equipment, inverters, electronics, batteries, cabin loads and the warfighter. Embodiments of the vapor compression system may be configured to thermally regulate these hotel loads to keep them at a predetermined temperature.

The control system may be configured in many ways to activate a burst mode cooling cycle of the system. In one embodiment, the controller is any electronic device or apparatus that activates, modulates, or deactivates the flow of refrigerant or heat transfer fluids in the system. The control system may include any electronic device or apparatus that controls a pump, fan, or valve which moves heat transfer fluid throughout the system.

In one embodiment, the control system is linked to one or more temperature sensors and activates a burst mode cooling cycle when a temperature sensor near the directed energy weapons system reaches a predetermined target temperature. The temperature sensor may be thermally linked to the directed energy weapons system so when that thermal load reaches the predetermined target temperature, a burst mode cooling cycle is begun. Alternatively, the control system may be electronically linked to an activation signal that triggers a burst mode cooling cycle. The activation signal may be controlled by a predictive process that senses a variety of data, including intelligent signaling of approaching target(s) and then predict when to activate a cooling cycle. For example, the control system may sense the present temperature of the thermal load, the time since the last activation, and the state of other equipment of devices linked to the directed energy weapons system. Using this data, the system may activate a burst mode cooling cycle just before the directed energy weapons system starts to heat. In some embodiments, the control system may activate a cooling cycle 1, 2, 3, 4, 5, 6, or 10 seconds in advance of a determined cooling event.

A. System

Figure 1:
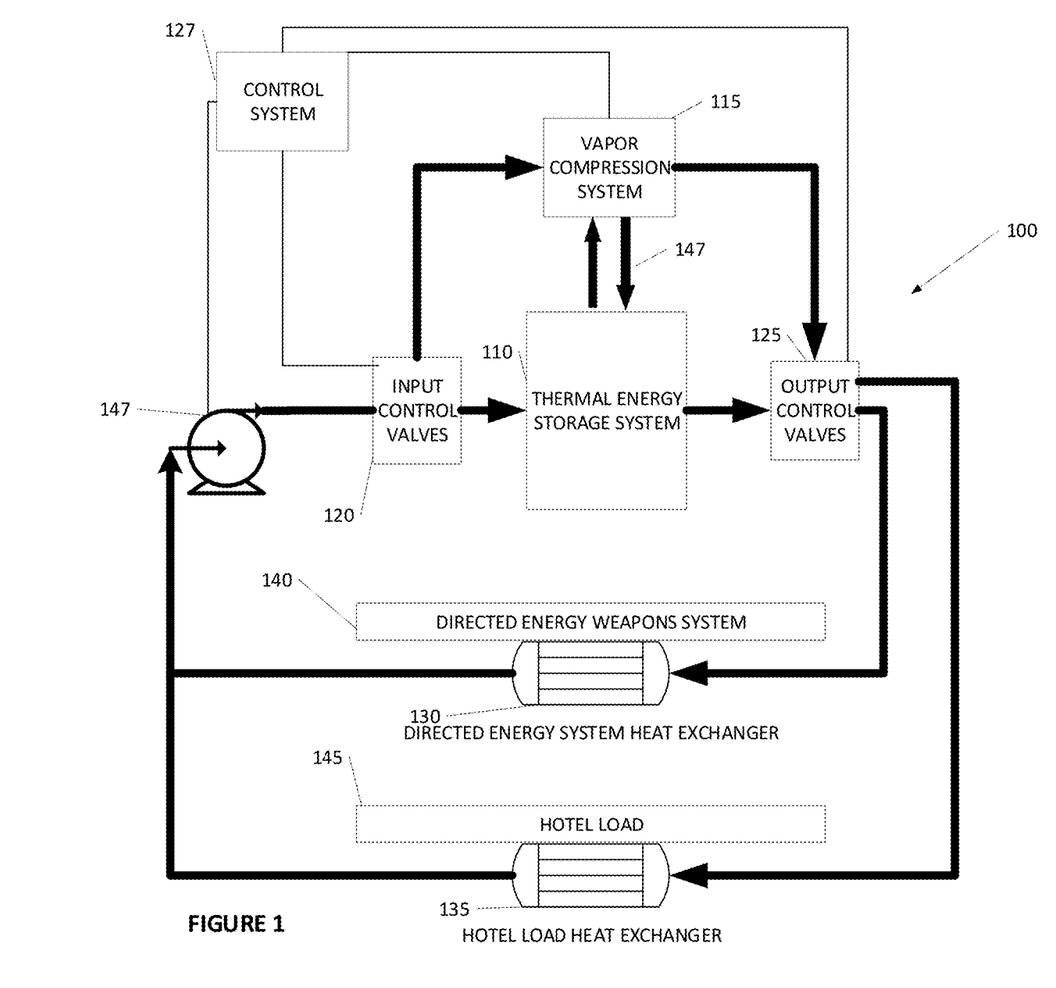
FIG. 1 is a schematic illustration of an embodiment of a thermal energy cooling system having a storage system and a vapor compression system according to one embodiment.

FIG. 1 shows one exemplary thermal energy cooling system 100 that has a vapor compression system 115 that is designed to provide burst mode cooling to rapidly cool a directed energy weapons system 140 during the first few seconds of operation by moving heat transfer fluid from a heat exchanger 130 adjacent and connected to the directed energy weapons system 140 to a thermal energy storage system 110.

The vapor compression system 115 connects to output control valves 125 which control output of thermal heat transfer fluid from the vapor compression system 115 to the heat exchanger 130 that is in thermal communication with a directed energy weapons system 140. The heat exchanger 130 then connects to a pump 147 which communicates with a set of input control valves 120 to form a vapor compression cooling loop from the vapor compression system 115 to the directed energy weapons system 140 and back again.

As shown in FIG. 1, the pump 147 and input control valves 120 also connect to the thermal energy storage system 110. The thermal energy storage system 110 may include frozen or partially frozen phase change material, such as potassium fluoride tetra hydrate, that is used to cool the directed energy weapons system while active. The thermal energy storage system is connected to the output control valves 125 which connect the thermal energy storage system to the directed energy weapons system heat exchanger 130. The directed energy weapons system heat exchanger 130 connects to the pump 147 which can return heated thermal heat transfer fluid from the directed energy weapons system heat exchanger 130 to the input control valves 120 and back to the thermal energy storage system 110 in a thermal energy storage system cooling loop. It should be realized that in one embodiment the vapor compression loop and the thermal energy storage system cooling loop may use the same refrigerant or thermal heat transfer fluid and thereby share some of the same piping, valves and pumps to communicate within the system 100. Alternatively, the system 100 may include parallel cooling loops from the vapor compression system and the thermal energy storage system where they do not share the same refrigerant, thermal heat transfer fluid, piping, valves and pumps, and therefore thermally communicate through the same or different heat exchangers with the directed energy weapons system.

In one embodiment, the vapor compression system 115 is designed to form a vapor compression cooling loop to the hotel load heat exchanger in order to cool the components of the system 100 that make up the hotel load. As shown, the output control valves 125 may route the thermal heat transfer fluid from the vapor compression system to the hotel load heat exchanger 135 that is adjacent to the hotel load 145. The pump 147 then may recirculate the thermal heat transfer fluid coming from the hotel load heat exchanger 135 back though the input control valves 120 to the vapor compression system 115, forming a loop.

As shown in FIG. 1, the vapor compression system 115 is also connected to the thermal energy storage system 110 through pipes 147 running heat transfer fluid through into the thermal energy storage system 110. In use, the vapor compression system may be used to cool and charge the thermal energy storage system. It should be realized that the thermal energy storage system 110 may comprise a series of heat transfer tubes or heat transfer plates which act as heat exchangers to transfer heat from heat transfer fluid to the frozen phase change material within the thermal energy storage system 110.

As mentioned above, the thermal energy storage system 110 and vapor compression system 115 are connected to the set of input control valves 120 and output control valves 125. These valves control the flow of thermal heat transfer fluid or two phase refrigerant through the system 100 and into and out of each component. As shown, a control system 127 is in electrical communication with the vapor compression system 115, input control valves 120 and output control valves 125. By opening and closing the electrically controllable valves within the input control valves 120 and output control valves 125 the control system may control which component of the system is circulating thermal heat transfer fluid or refrigerant at any particular time during operation.

The output control valves 125 connect to a directed energy system heat exchanger that is in thermal communication with a directed energy weapons system 140. The directed energy weapons system 140 is shown as being thermally connected to the heat exchanger 130. In the case that two phase refrigerant is being circulated within the system 100, it should be realized that the heat exchanger may be an evaporator configured to change or partially change the phase of the refrigerant. In the case that a thermal heat transfer fluid or media such as glycol-water is being circulated, the heat exchangers may be heat transfer tubes, coils or plates configured to absorb heat into the thermal heat transfer fluid.

In one embodiment, the directed energy weapons system may be a high-energy laser, and the directed energy system heat exchanger 130 may be in thermal communication with the laser diodes and diode amplifiers of that system which generate the bulk of heat bursts while the system is activated. A high-energy laser may include lasers that are 3, 5, 10, 15, 30, 50, 75, 100, 125, 150, 250, or 500 kilowatt or higher energy lasers.

The output control valves 125 also connect to the one or more hotel loads heat exchangers 135 that are in thermal communication with the hotel load 145 adjacent to the directed energy weapons system 140. As discussed above, the hotel load 145 may include the batteries, motors, radar, communications and other equipment that is ancillary to the directed energy weapons system. As mentioned above, in the circumstance where thermal transfer media such as glycol-water is used instead of refrigerant, the hotel load heat exchangers may be replaced with a thermal transfer system configured to transfer heat to the thermal transfer media.

The pump 147 is connected to the outputs of the directed energy weapons system heat exchanger 130 and hotel load heat exchanger 135 and used to move thermal heat transfer fluid or refrigerant into the input control valves 120 so the system may recirculate these fluids into the thermal energy storage system 110 or vapor compression system 115.

It should be realized that the system 100 may include more than the one pump 147 and that additional pumps, fans, valves and motors may be included within the system to operate as described herein. For example, additional pumps may be included adjacent to the output control valves 125 to move thermal heat transfer fluid to the heat exchangers 130, 135. Fans may be disposed adjacent to the directed energy system heat exchanger 130 or hotel load heat exchanger 135 to move heated or cooled air across the heat exchangers.

The system 100 is flexible in that during the use the system may route heated fluid from the directed energy weapons system heat exchanger 130 into either or both of the vapor compression system and thermal energy storage system. Depending on the temperature of the heat transfer fluid, and the predicted cooling needs of the system, the heat transfer fluid may be routed to only the thermal energy storage system for cooling. However, in some embodiments, the heat transfer fluid may be routed in parallel or sequentially through the thermal storage system and the vapor compression system.

Figure 2:
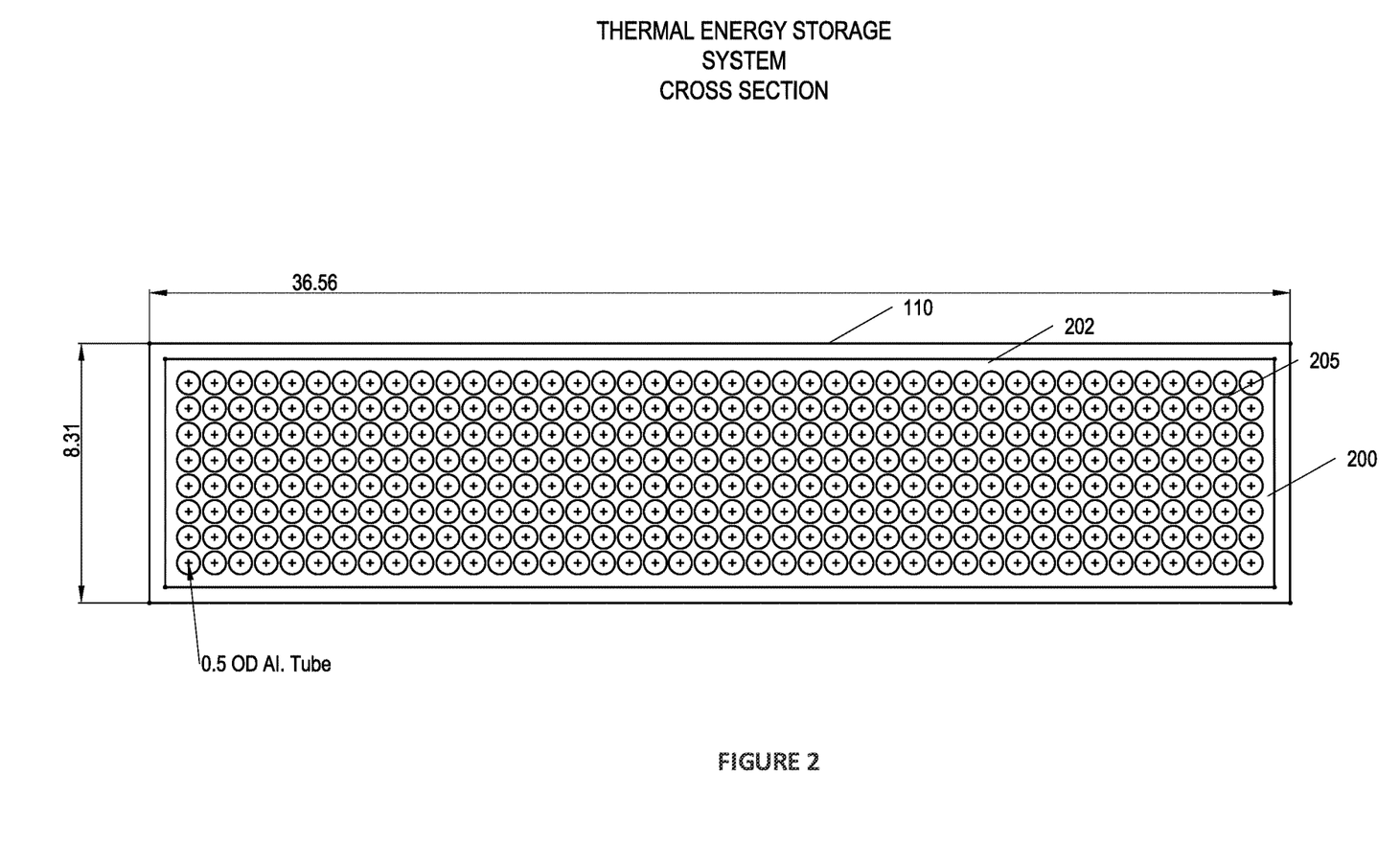
FIG. 2 is a schematic illustration of the cross section of a thermal energy storage system of FIG. 1, according to one embodiment.

FIG. 2 shows a cross-sectional view of the thermal energy storage system 110. As shown the thermal energy storage system 110 contains a tank or enclosure 200, filled with a heat transfer fluid 202, and having a series of heat transfer tubes 205 which are filled with phase change material and which are disposed within a set of support brackets or cavities within the tank 200. The size and number of heat transfer tubes deposited within the tank 200 can be chosen to maximize the thermal transfer of heat from the heat transfer fluid 202 circulating in the tank into the phase change material within the heat transfer tubes 205. In this embodiment, the tubes have an outer diameter of 0.5", but they could be any dimension between ¼" and 1" and functionally similar. Each tank may have 25, 50, 100, 200, 300, 400, 500, 1000, 2000, 3000, 4000, 5000 or more heat transfer tubes depending on the specific architecture of the thermal energy storage system. In one embodiment, the tank 200 includes about 300 heat transfer tubes that are 0.5" in outer diameter and about 60 inches in length.

Figure 3:
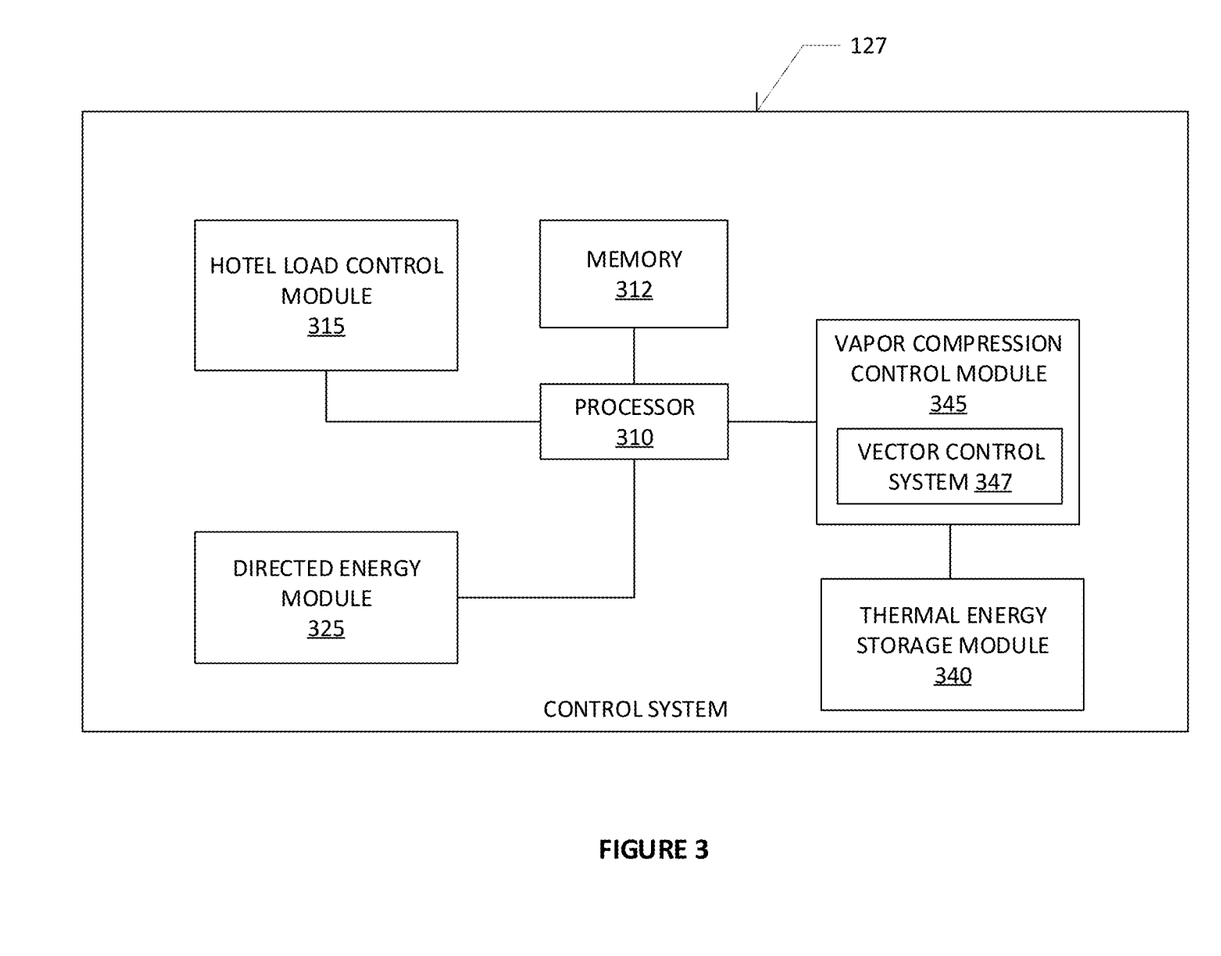
FIG. 3 is a block diagram of an embodiment of a control system that is part of the thermal energy cooling system of FIG. 1.

FIG. 3 shows an illustration of the control system 127, which is programmed with instructions to control operations of the system 100. The control system 127 includes a processor 310 which may be any type of well-known microprocessor or microcontroller that is capable of managing the valves, fans and other components of the system 100. The processor 310 is connected to a memory 312 for storing programs and commands for operating the system.

The processor 310 is connected to a directed energy module 325 which includes instructions for activating a cooling cycle in response to the directed energy weapons system being activated by firing. In one embodiment, the directed energy module 325 is programmed to activate the burst mode cooling cycle from the vapor compression system and begin to rapidly cool the thermal load when a predetermined signal is received by control system 127. The signal may be an activation signal from a firing system connected to the directed energy weapons system. With each firing event the weapon system may interface with a vapor compression control module 345 to trigger the burst cooling mode of the system 100 in order to reduce the temperature of the weapon system.

In one embodiment, the directed energy module 325 communicates with a temperature sensor which monitors the temperature of the directed energy thermal load. In one embodiment, the directed energy module 325 activates a burst cooling cycle by interfacing with the vapor compression control module 345 when the temperature of the directed energy load reaches a predetermined temperature. For example, when the temperature of the directed energy system is above 30° C., then the directed energy module 325 instructs the vapor compression control module 345 to begin rapidly circulating heat transfer fluid to the directed energy weapons system heat exchanger and through the thermal energy storage system. When the temperature is below 15° C. a heating system is activated to bring up the temperature. In some embodiments, the vapor compression control module may be activated when the temperature of the directed energy load is above 25° C. or above 35° C. In some embodiments a heating system may be activated when the temperature of the directed energy system is below 10° C. or below 20° C.

Of course, embodiments are not limited to performing only a single burst cooling procedure. During activation, the thermal load, or an attached weapons system, may request multiple burst mode cooling operations to maintain the temperature of the thermal load below a certain target temperature.

While burst mode cooling can be performed by operating the vapor compression system or the vapor compression system and the thermal energy storage system, in some embodiments, the system performs a burst mode cooling cycle by only communicating with the thermal energy storage system. For example, as shown in FIG. 3, the thermal energy storage module 340 may also be activated by the directed energy module 325 to begin a cooling cycle in response to the directed energy weapons system being discharged. For example, following a discharge the directed energy module may instruct the thermal energy storage module 340 to begin a cooling cycle. The thermal energy storage module 340 would then adjust the input control valves and output control valves so that thermal heat transfer fluid running through the thermal energy storage system begins circulating in a thermal energy cooling loop though the heat exchanger adjacent to the directed energy weapons system.

The vapor compression control module 345 may include instructions for managing the motor, valve and pump functions of the vapor compression system discussed above. For example, the vapor compression control module may control the input valves and output valves, along with valves routing thermal heat transfer fluid into and out from the thermal energy storage system. By manipulating these valves, the vapor compression control module may route thermal heat transfer fluid to the particular components of the system 100 as needed to efficiently operate the system.

As shown the vapor compression control module may also include a vector control system 347 that is configured as discussed above to provide efficient control of the vapor compression system compressor and torque. For example, the vector control system 347 may monitor the torque placed on a compressor within the vapor compression system and adjust the speed of one or more fans or blowers to alter the pressure within the system to increase, or decrease, the torque placed on the compressor to increase the vapor compression system efficiency.

After the burst mode cooling requests have subsided, the control system 127 the thermal energy storage module 340 may communicate with a temperature sensor within the thermal energy storage system and activate the vapor compression system to start cooling the thermal energy storage system back down to its target temperature and freeze the phase change material.

As shown, the control system 127 also includes a hotel load control module 315 for controlling cooling of the hotel loads within the system 100. The hotel load control module 315 may include instructions for reading data from temperature or other environmental sensors and determining the proper parameters for cooling or heating the hotel load or adjacent systems of the directed energy weapons system. For example, if the hotel load control module 315 receives data showing that the hotel load is above 40° C. it may activate the vapor compression system to begin a cooling cycle to reduce the temperature of the hotel load back down to a target temperature. Similarly, if the hotel load control module 315 determines that the thermal load is below, for example, 5° C. it may initiate a heating cycle of the vapor compression system or an auxiliary heater to increase the temperature of the thermal load up to a target temperature.

In one embodiment, the hotel load control module 315 maintains the temperature of the hotel load or ancillary equipment within the range of 25° C. to 50° C. In another embodiment, the hotel load control module 315 maintains the temperature of the hotel load or ancillary equipment within the range of 20° C. to 30° C. However, embodiments are not limited to only these temperature ranges. The hotel load control module 315 may be designed to maintain the temperature of the thermal load or ancillary equipment to be above its minimum equipment design operating temperature in cold climates for an efficient start-up. Similarly, the hotel load control module 315 may be designed to cool the hotel load or ancillary equipment to be below the equipment's maximum design operating temperature at any ambient temperature if the equipment generates heat. This allows the equipment to be placed in relatively hot ambient environments, such as the desert, where the ambient conditions alone may require cooling of the equipment to be within the range of, for example, 5° C. to 40° C.

Other embodiments include a hotel load control module 315 that maintains the temperature of the hotel load or ancillary equipment in order for efficient cooling of the thermal load to occur. Of course, the system is not limited to only managing thermal loads at these temperature parameters. The hotel load control module 315 may detect when temperatures of a thermal load is above 5° C., 10° C., 15° C., 20° C., 25° C., 30° C., 35° C., 40° C. or more before activating the vapor compression system. In some embodiments the hotel load control module 315 is also configured to maintain operating temperatures of equipment that is a subsystem, of linked system to the thermal load. For example, the thermal load may be adjacent to, or electronically linked with, electronic subsystems, such as radar, electronic or power inverters, generators, high-capacity batteries, cabin/enclosures and warfighter cooling systems. The hotel load control module 315 may be designed to maintain the operating temperatures of each of these ancillary devices or systems in addition to maintaining the operating temperature of the thermal load and adjacent equipment.

The hotel load control module 315 may also gather data from other sources, such as through a network connection to determine the predicted environmental temperature for the day. For example, the hotel load control module 315 may receive the predicted daytime high temperature from a weather service across a network and use that data to ensure that the thermal load or other ancillary components of the target system remain cool to a predetermined target temperature.

It should be realized that aspects of the control system may manage the variable speed operation of various pumps and fans within the system based on the temperature of the thermal load. For example, as the temperature of the thermal load, or surrounding environment, increases the speed of pumps and fans within the system may also increase. Similarly, as the temperature of the thermal load, or surrounding environment decreases, the controller may slow the speed of the pumps and/or fans.

B. Operation

In operation, a cycle may be activated when a directed energy weapons system is first begun to be powered up for use. While the below operation is described for circulating refrigerant to the hotel load and directed energy system coil, it should be realized that the system is not limited to using phase change refrigerant, and thermal heat transfer fluids may also work similarly within the system.

As can be realized, these systems include ancillary equipment that may need to be cooled before the system becomes fully operational. For example, the ancillary equipment may be powered on along with the vapor compression system. The control system may therefore activate the output control valves such that the refrigerant output of the vapor compression system is routed to the various components of the hotel load heat exchanger, the input control valves are set to recirculate the refrigerant from the hotel load heat exchanger back to the vapor compression system, and the pump is activated to move the refrigerant in a cooling loop to begin removing heat from the hotel load.

The control system may detect the temperature of the thermal energy storage system using a temperature sensor, and determine if the thermal energy storage system is cooled to a target temperatures so that it may act as a heat capacitor to absorb excess heat from the system once the system becomes operational. If the control system determines that the temperature of the thermal energy storage system is above a predetermined threshold it may begin routing thermal heat transfer fluid or refrigerant that has been cooled by the vapor compression system into the thermal energy storage system. The control system may include programming to balance the cooling requirements of the hotel load against the necessity to also cool the thermal energy storage system, and determine the priority for each system based on their current temperature and how soon the system may need to use the thermal energy storage system.

Once the system is ready to fire, the vapor compression system may be put into a standby mode where it is ready to begin burst mode cooling as soon as a firing event is detected or a control signal indicates immediate firing to be initiated. Once a firing event is signaled or detected the system will enter a burst mode cooling cycle. The control system will activate the thermal energy storage system loop so that heated thermal heat transfer fluid from the directed energy system heat exchanger is routed into the thermal energy storage system.

As the directed energy system heat exchanger continues to detect firing events and transfers heat from the heat exchanger to the thermal energy storage system for burst cooling, the control system may monitor each component to ensure that the flexible system is operating efficiently. For example, in one embodiment in the first 5, 10, 15, 20, 25, 30 or more seconds following activation the heated thermal heat transfer fluid from the directed energy system heat exchanger may not be routed to the vapor compression system because the cooling requirement during that firing event may be handled sufficiently by the thermal energy storage system. However, as the firing events continue and the thermal load of the directed energy weapons system maintains or increases, the control system may route a portion of the refrigerant coming from the directed energy weapons system heat exchanger directly to the vapor compression system.

It should be realized that in some embodiments the vapor compression cooling system is used to supplement the cooling provided by the thermal energy storage system. Thus, following activation, the thermal energy storage system may provide rapid burst mode cooling for the first seconds after the weapon's activation. Then, or even simultaneously, the vapor compression system may be activated to provide a secondary cooling loop to the directed energy weapons system heat exchanger and provide additional cooling capacity above that provided by the thermal energy storage system.

Figure 4:
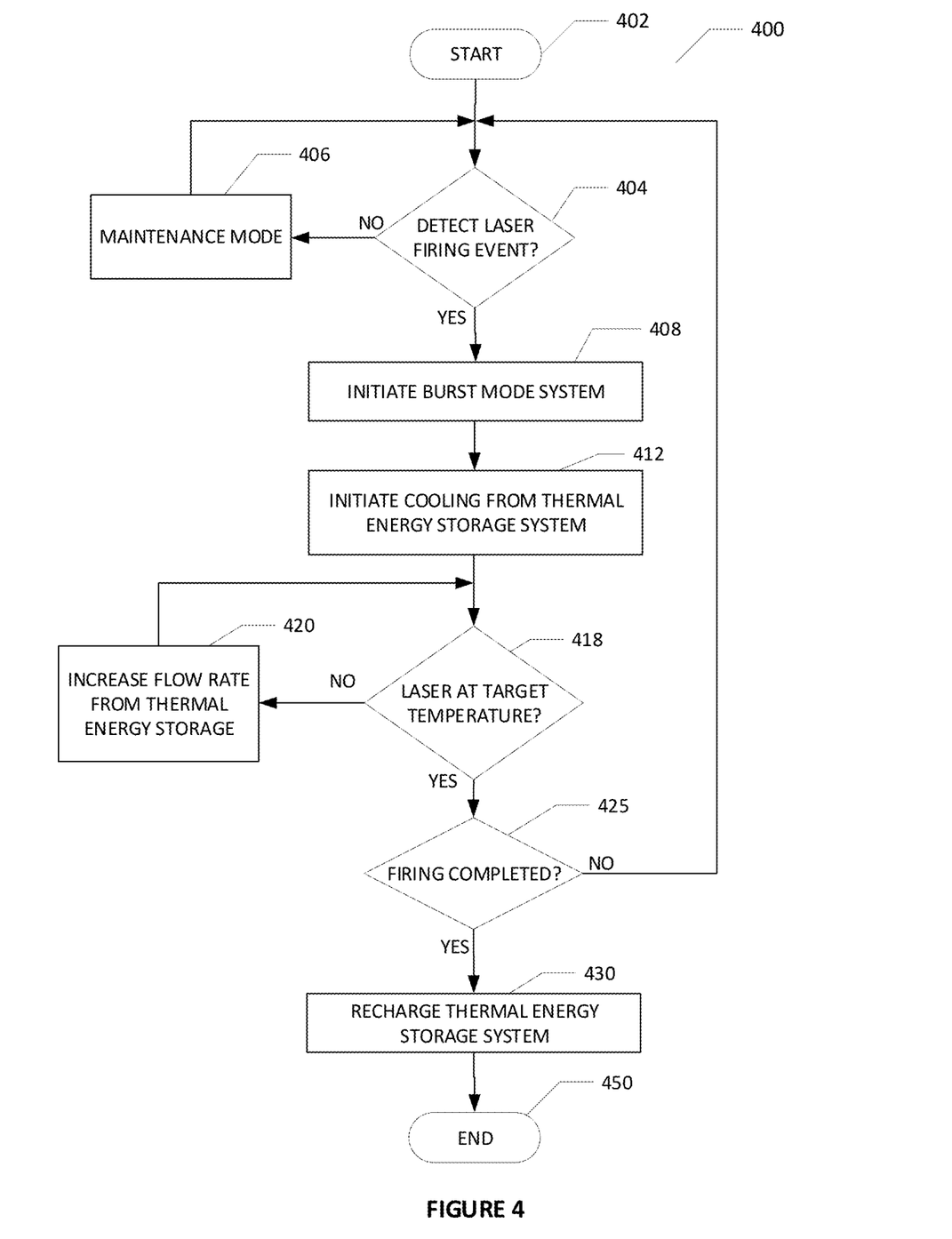
FIG. 4 is a flow diagram of one embodiment of operating a thermal energy cooling system.

FIG. 4 describes one process 400 for cooling a laser weapon. The process 400 begins at a start state 402 and then moves to a decision state 404 wherein a determination is made whether a laser firing event has been detected by the control system. If a laser firing event is not detected the process 400 moves to state 406 and enters a maintenance mode. In the maintenance mode the system continues to maintain the hotel load at a target operational temperature so that the system is ready to operate once a firing event has been detected. During the maintenance mode the vapor compression system may be used to recharge the phase chance material or media housed within the thermal energy storage system so that the thermal energy storage system is prepared to deliver cooling power to the system when needed.

If a determination is made at the decision state 404 that a laser firing event has been detected, then the process 400 moves to a state 408 wherein the thermal energy storage system is initiated to quickly absorb a burst of heat, for example 10, 25, 50, 100, 150, 200 or more kilowatts of heat energy from the laser system. After activating of the burst mode cooling system at the state 408, the process 400 moves to a state 412 wherein a cooling loop from the vapor compression system is activated to provide additional cooling power to the laser weapon. Because the vapor compression system may take additional time to absorb heat, it may be used as an ancillary cooling supply to the more rapid cooling provided in the first few seconds after a firing event by the thermal energy storage system.

After the cooling loop from the thermal energy storage system has been initiated, the process 400 moves to a decision state 418 wherein a determination is made whether the laser weapons system is at its target temperature. Typically, this target temperature may be between 15° C. and 30° C. If the laser weapons system is not at the target temperature then the process 400 moves to a state 420 wherein the flow rate of the cooling loop from the thermal energy storage system may be increased to help move additional heat away from the laser weapons system. Additionally, a vapor compression system may also be brought online to add additional cooling power to the overall system and help reduce the temperature of the laser weapons system.

If a determination is made that the laser is at the target temperature, then the process 400 moves to a state 425 wherein a determination is made whether the laser firing process has been completed. If the process has not been completed, then the process 400 returns to the decision state 404 in order to wait for additional firing events. If a determination is made at the decisions state 425 that the laser firing has been completed then the process 400 moves to a state 430 wherein the vapor compression system may begin recharging the phase change material within the thermal energy storage system so it can be ready to provide additional cooling for future firing events. The process 400 then moves to an end state 450 and terminates.

Example

A thermal energy storage system is made that is capable of cooling a laser weapon that outputs 100 kW of heat. In this example, the laser outputs bursts of energy over a 120 second period and then stays deactivated for 280 seconds. The thermal energy storage system uses an enclosure that contains heat transfer tubes of potassium fluoride tetrahydrate as the phase change material. A 100 kW heat load from a laser that is active over a 120 second period generates 12,000 kJ of heat energy that needs to be dissipated. Potassium fluoride tetrahydrate is able to store 230 kJ/kg of material, thus the thermal energy storage system is made from 52.2 kg of potassium fluoride tetrahydrate to absorb 12,000 kJ of heat energy.

The material density of potassium fluoride tetrahydrate is 1455 kg/m$^3$ so that 52.1 kg of material requires a volume of 0.0359 m$^3$ of space within the heat transfer tubes located inside the thermal energy storage system enclosure.

A vapor compression system with a cooling capacity of at least 20 kW, preferably 25 kW or more with phase change refrigerant is thermally connected to the thermal energy storage system to recharge the system in less than 10 minutes following discharge by cooling the laser weapon.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A thermal energy cooling system for a high-energy laser, comprising:
   a thermal energy storage system comprising phase change material having a transition temperature of between 10° C. and 20° C., a phase change material energy density of at least 200 kJ/kg, a phase change material density of at least 1 g/cc and a phase change material thermal conductivity of at least 0.5 W/mK;
   a cooling loop comprising a heat transfer fluid connected to the thermal energy storage system and a heat exchanger in thermal communication with the high-energy laser; and a control system programmed to read sensor data and determine when to initiate burst mode cooling to initiate discharge of the thermal energy storage system, wherein the burst mode cooling comprises pumping the heat transfer fluid through the cooling loop including the thermal energy storage system that is capable of discharging over a period of less than five minutes, wherein the control system monitors the amount of frozen phase change material in the thermal energy storage system, and prevents additional melting and/or initiates additional freezing of the phase change material, if the amount of frozen phase change material is below a predetermined threshold.

2. The thermal energy cooling system of claim 1, wherein the system further comprises a vapor compression system configured to recharge the phase change material in the thermal energy storage system in a recharge period of less than 25 minutes.

3. The thermal energy cooling system of claim 2, wherein the vapor compression system initially provides fluid at a temperature of below 10° C. to the thermal energy storage system to initiate a crystallization process of the phase change material, and following such initialization, then provides fluid at a temperature at or above 10° C. to continue freezing the phase change material while optimizing energy efficiency of the thermal energy cooling system.

4. The thermal energy cooling system of claim 2, wherein the recharge period is less than 10 minutes.

5. The thermal energy cooling system of claim 2, wherein the recharge period is less than 5 minutes.

6. The thermal energy cooling system of claim 2, wherein pumice is used as a nucleation agent to reduce subcooling in the recharge process.

7. The thermal energy cooling system of claim 2, wherein the vapor compression system is configured to cool ancillary equipment connected to the high-energy laser system.

8. The thermal energy cooling system of claim 1, wherein the discharge period is less than three minutes.

9. The thermal energy cooling system of claim 1, wherein the heat transfer fluid to the directed energy weapon system is cooled to between 20° C. and 30° C. during the discharge period.

10. The thermal energy cooling system of claim 1, wherein the discharge of the thermal energy storage system results in a phase change of at least 50% of the phase change material.

11. The thermal energy cooling system of claim 1, wherein the discharge of the thermal energy storage system results in a phase change of at least 75% of the phase change material.

12. The thermal energy cooling system of claim 1, wherein the discharge of the thermal energy storage system results in a phase change of at least 90% of the phase change material.

13. The thermal energy cooling system of claim 1, wherein the phase change material is a hydrated salt complex.

14. The thermal energy cooling system of claim 13, wherein the hydrated salt complex is potassium fluoride tetrahydrate.

15. The thermal energy cooling system of claim 1, wherein the thermal energy storage system comprises an enclosure and a plurality of heat transfer tubes, and the phase change material is positioned inside the heat transfer tubes.

16. The thermal energy cooling system of claim 15, wherein the heat transfer tubes have an outer diameter of between ¼ inch and 1 inch.

17. The thermal energy cooling system of claim 1, wherein the thermal energy storage system comprises an enclosure and a plurality of heat transfer tubes, and the phase change material is positioned outside the heat transfer tubes.

18. The thermal energy cooling system of claim 1, wherein the thermal energy storage system comprises an enclosure and a plurality of heat transfer plates, wherein the phase change material is positioned between heat transfer plates.

19. The thermal energy cooling system of claim 1, wherein the thermal energy storage system comprises an enclosure and a series of grooves, wherein the phase change material is positioned in the grooves.

20. The thermal energy cooling system of claim 1, wherein the heat transfer fluid is a glycol/water mixture.

21. The thermal energy cooling system of claim 1, wherein the heat transfer fluid is a phase change refrigerant.

22. The thermal energy cooling system of claim 1, wherein the control system for the fluid flow through the thermal energy storage system comprises a vector control system that accounts for fluid flow and pressure drop while controlling the pump.

23. The thermal energy cooling system of claim 1, wherein the sensor data comprises temperature sensor data, operating status signals, or detection signals from one or more sensors.

24. The thermal energy cooling system of claim 23, wherein the thermal energy cooling system, high-energy laser system, and one or more sensors are located on a platform.

25. The thermal energy cooling system of claim 23, wherein the thermal energy cooling system and the high-energy laser are located on a platform, and the one or more sensors are not located on the platform.

26. The thermal energy cooling system of claim 23, wherein the thermal energy cooling system and the high-energy laser are located on a platform, and one or more signals are received from locations not located on the platform.

27. The thermal energy cooling system of claim 1, wherein the predetermined threshold is a value between 2% and 5% of the total volume of phase change material.

28. The thermal energy storage system of claim 1, wherein the predetermined threshold is a value between 5% and 15% of the total volume of phase change material.

29. The thermal energy storage system of claim 1, wherein the predetermined threshold is above 15% of the total volume of phase change material.

30. A thermal energy cooling system for a high-energy laser, comprising:
  a thermal energy storage system comprising phase change material having a transition temperature of between 10° C. and 20° C., a phase change material energy density of at least 200 kJ/kg, a phase change material density of at least 1 g/cc and a phase change material thermal conductivity of at least 0.5 W/mK;
  a cooling loop comprising a heat transfer fluid connected to the thermal energy storage system and a heat exchanger in thermal communication with the high-energy laser; and
  a control system programmed to read sensor data and determine when to initiate burst mode cooling to initiate discharge of the thermal energy storage system, wherein the burst mode cooling comprises pumping the heat transfer fluid through the cooling loop including the thermal energy storage system that is capable of discharging over a period of less than five minutes, wherein the system further comprises a vapor compression system configured to recharge the phase change material in the thermal energy storage system in a recharge period of less than 25 minutes, and wherein the vapor compression system initially provides fluid at a temperature of below 10° C. to the thermal energy storage system to initiate a crystallization process of the phase change material, and following such initialization, then provides fluid at a temperature at or above 10° C. to continue freezing the phase change material while optimizing energy efficiency of the thermal energy cooling system.

31. A thermal energy cooling system for a high-energy laser, comprising:

a thermal energy storage system comprising phase change material having a transition temperature of between 10° C. and 20° C., a phase change material energy density of at least 200 kJ/kg, a phase change material density of at least 1 g/cc and a phase change material thermal conductivity of at least 0.5 W/mK;

a cooling loop comprising a heat transfer fluid connected to the thermal energy storage system and a heat exchanger in thermal communication with the high-energy laser; and a control system programmed to read sensor data and determine when to initiate burst mode cooling to initiate discharge of the thermal energy storage system, wherein the burst mode cooling comprises pumping the heat transfer fluid through the cooling loop including the thermal energy storage system that is capable of discharging over a period of less than five minutes, wherein the system further comprises a vapor compression system configured to recharge the phase change material in the thermal energy storage system in a recharge period of less than 25 minutes, and wherein pumice is used as a nucleation agent to reduce subcooling in the recharge process.

* * * * *